(12) United States Patent
Gurunathan et al.

(10) Patent No.: US 7,068,374 B2
(45) Date of Patent: Jun. 27, 2006

(54) PHASE-DIVERSE COHERENT OPTICAL SPECTRUM ANALYZER

(75) Inventors: Mohan Gurunathan, San Francisco, CA (US); William I. McAlexander, Redwood City, CA (US); Richard D. Pering, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 391 days.

(21) Appl. No.: 10/458,336

(22) Filed: Jun. 9, 2003

(65) Prior Publication Data

US 2004/0246491 A1   Dec. 9, 2004

(51) Int. Cl.
*G01B 9/02* (2006.01)
(52) U.S. Cl. .................................................... 356/484
(58) Field of Classification Search ............... 356/477, 356/484; 398/204
See application file for complete search history.

(56) References Cited

U.S. PATENT DOCUMENTS

| | | | | |
|---|---|---|---|---|
| 4,868,896 | A * | 9/1989 | Pietzsch | 398/204 |
| 5,060,312 | A * | 10/1991 | Delavaux | 398/204 |
| 5,146,359 | A * | 9/1992 | Okoshi et al. | 398/202 |
| 5,365,185 | A | 11/1994 | Bar-David | |
| 6,426,496 | B1 * | 7/2002 | Froggatt et al. | 250/227.18 |
| 2003/0146743 | A1 | 8/2003 | Truesdale | |
| 2004/0114939 | A1 | 6/2004 | Taylor | |
| 2004/0239943 | A1 * | 12/2004 | Izatt et al. | 356/479 |

FOREIGN PATENT DOCUMENTS

| EP | 1 591 171 A | 3/2005 |
|---|---|---|
| GB | 2 197 461 A | 5/1988 |

OTHER PUBLICATIONS

Douglas M. Baney, et al.; "Coherent Optical Spectrum Analyzer"; IEEE Photonics Technology Letters, vol. 14, No. 3, Mar. 2002; pp. 355-357.
Leonid G. Kazovsky; "Phase- and Polarization-Diversity Coherent Optical Techniques"; Journal of Lightwave Technology, vol. 7, No. 2, Feb. 1989; pp. 279-292.
S. Yamashita; "Two-Branch Double-Stage Phase-Diversity (DSPD) Coherent Receiver Using A 3×3 Fiber Coupler"; IEEE Photonics Technology Letters, vol. 6, No. 11, Nov. 1994; pp. 1386-1388.
R. Lagenhorst, et al.; "Balanced Phase and Polarization Diversity Coherent Optical Receiver"; IEEE Photonics Technology Letters, vol. 3, No. 1, Jan. 1991; pp. 80-82.
Takanori Okoshi, et al.; "Double-Stage Phase-Diversity Optical Receiver: Analysis and Experimental Confirmation of the Principle"; Journal of Lightwave Technology, vol. 8, No. 3, Mar. 1990; pp. 376-384.
European Search Report Dated: May 4, 2005.

\* cited by examiner

*Primary Examiner*—Samuel A. Turner
*Assistant Examiner*—Michael A. Lyons

(57) ABSTRACT

A phase-diverse coherent optical spectrum analyzer is presented. An optical receiver receives a first input signal and a second input signal, and produces at least a first output signal, a second output signal, and a third output signal based on mixing the first input signal and the second input signal. A processing unit isolates heterodyne components from the first output signal, the second output signal and the third output signal, wherein the heterodyne components comprise a first signal and a second signal that represent the phase-diverse nature of the optical mixing process. Phase diversity of the heterodyning between the first input signal and the second input signal is achieved by the coherent optical spectrum analyzer.

25 Claims, 6 Drawing Sheets

Relative Phase of Quadrature Signals

450

Relative Phase of Heterodyne Terms

400

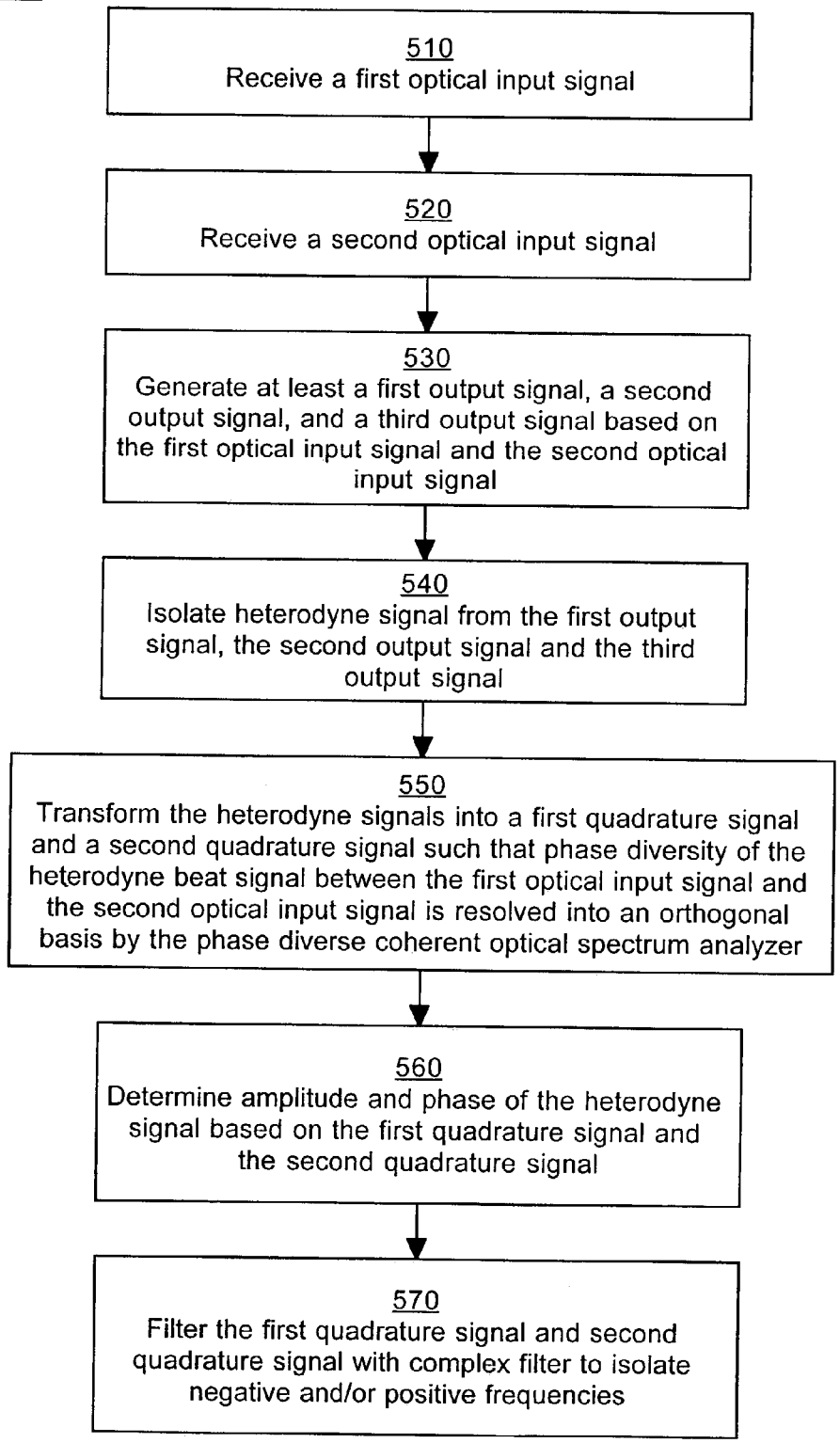

PHASE-DIVERSE COHERENT OPTICAL SPECTRUM ANALYZER

FIELD OF INVENTION

Various embodiments in accordance with the invention relate to the field of optical spectral analysis.

BACKGROUND OF THE INVENTION

High-resolution optical spectrometers (also known as coherent optical spectral analyzers) are used to observe spectral features of an unknown signal. Some high-resolution optical spectrometers implement a heterodyne architecture, based upon principles of coherent optical spectral analysis, to achieve very fine measurement resolution. In accordance with this heterodyne architecture, current high-resolution spectrometers utilize a 2×2 optical coupler to combine the unknown signal with a local oscillator signal generated by a local oscillator that is intentionally set to oscillate at a known frequency or to sweep across a range of frequencies. The two outputs of the coupler are detected through a nonlinear detector, such as a photodiode, and the resulting electrical signals subtracted from one another to produce the desired heterodyne signal. From this, the spectral features of the unknown signal can be obtained.

One of the principle uses of a high-resolution optical spectrometer is to map out the spectral amplitude of the unknown signal as a function of wavelength. To perform such a measurement, the local oscillator signal is swept across different wavelengths, while the heterodyne signal due to mixing with the unknown signal is acquired. Unfortunately, the current receiver architecture, which is based on a 2×2 optical coupler, is unable to measure the precise phase of the heterodyne signal. Since the phase of the heterodyne signal varies throughout the scan, as well as from scan to scan, amplitude uncertainty is introduced into the spectral measurement. This amplitude uncertainty is especially evident when intermediate frequency (IF) receivers with low-pass filters are employed. Furthermore, the inability to observe the phase of the heterodyne signal also results in the receiver being equally sensitive to both positive and negative heterodyne beat frequencies. Therefore, any attempt to reduce phase uncertainty by using a bandpass receiver will result in the formation of spectral images that limit the ultimate resolution of the device.

The problem with measuring the phase of the heterodyne signal stems from the basic phase ambiguity of a sinusoidal function. Typically, the heterodyne signal as described above will have the general form:

$$H(t)=V(t) \cos (2\pi\Delta ft+\phi(t)) \quad (1)$$

as shown in Equation 1, where $\Delta f$ represents a frequency difference between the local oscillator and unknown signals, and $\phi(t)$ represents the relative phase of the heterodyne beat signal. A single measurement of H(t) is unable to resolve V(t), the desired heterodyne amplitude, since there are two unknowns (V(t) and $\phi(t)$). Even if V(t) is known or assumed constant in time it is impossible to compute with certainty the phase argument $(2\pi\Delta ft+\phi(t))$, simply because the arc-cosine function is not single-valued. Therefore, from a measurement of H(t), it is not possible to know with certainty the relative phase $\phi(t)$, nor whether the frequency difference $\Delta f$ is positive or negative. Furthermore, variations in the amplitude of the heterodyne signal V(t) make determination of the phase argument even more problematic.

Ultimately, two independent and simultaneous measurements of H(t) are needed to obtain the two unknowns V(t) and $\phi(t)$.

The problem is solved if the heterodyne signal H(t) can be represented as a vector, rather than scalar, quantity. If H(t) is of the form:

$$H(t)=V(t)e^{i(2\pi\Delta ft+\phi(t))} \quad (2)$$

as shown in Equation 2, then the phase argument $(2\pi\Delta ft+\phi(t))$ can be computed, without ambiguity, as shown in Equation 3:

$$\angle H(t) = \arctan\left(\frac{\text{Im}\{H(t)\}}{\text{Re}\{H(t)\}}\right) \quad (3)$$

The measurement of the Real and Imaginary components of H(t) constitute the needed dual simultaneous measurement of H(t). The unambiguous nature of this phase computation can easily be understood by drawing H(t) as a vector in the complex plane. There are three main benefits to the vector representation of H(t), over the scalar. Firstly, it becomes completely clear whether the heterodyne frequency $\Delta f$ is positive or negative. Secondly, the relative phase $\phi(t)$ can be determined without ambiguity. Finally, the phase measurement is now completely decoupled from variations in the heterodyne amplitude V(t)—and conversely, measurements of V(t) are insensitive to variations in the phase angle of the heterodyne signal. Herein, any system that generates or operates on a vector heterodyne signal, which in turn may be resolved into an orthogonal basis, will be known as a "phase-diverse" system. With regard to coherent optical spectral analysis, the use of phase-diverse techniques translates directly to spectral image elimination and improved amplitude accuracy.

The issue of phase-diversity has been addressed in the field of coherent optical communications. The use of phase-diverse receivers in coherent communication systems has enabled a number of advances, such as eliminating crosstalk effects from adjacent data channels. However, while phase-diverse receiver techniques have found some application in coherent communications, little has been carried over to the realm of optical spectral analysis. Since optical spectral analysis is focused on measurements in the frequency-domain, rather than time-domain, the receiver requirements are often very different from those in time-domain communications applications.

SUMMARY OF THE INVENTION

Various embodiments in accordance with the invention, a phase-diverse coherent optical spectrum analyzer, are described herein. In one embodiment in accordance with the invention, the optical phase-diverse coherent optical spectrum analyzer isolates the In-phase and Quadrature (e.g., Real and Imaginary) heterodyne components of the output signals, such that the phase-diverse coherent optical spectrum analyzer achieves phase diversity of the heterodyne signal. In another embodiment in accordance with the invention, a method for spectral analysis of an optical signal is provided. Two optical input signals are received, and at least three phase-diverse output signals are produced based on mixing of the input signals. From these phase-diverse heterodyne output signals the quadrature components of the output signals are isolated, wherein the quadrature components comprise two signals with a 90-degree relationship. In this way the phase-diverse coherent optical spectrum analyzer achieves phase diversity of the heterodyne mixing between the input signals.

BRIEF DESCRIPTION OF THE DRAWINGS

The accompanying drawings, which are incorporated in and form a part of this specification, illustrate embodiments in accordance with the invention and, together with the description, serve to explain the principles of the invention:

FIG. 5 is a flowchart illustrating a process for analyzing an optical signal of an embodiment in accordance with the invention.

DETAILED DESCRIPTION OF THE INVENTION

Reference will now be made in detail to various embodiments in accordance with the invention, examples of which are illustrated in the accompanying drawings. While the invention will be described in conjunction with various embodiments in accordance with the invention, it will be understood that they are not intended to limit the invention to these embodiments in accordance with the invention. On the contrary, the invention is intended to cover alternatives, modifications and equivalents, which may be included within the spirit and the scope of the invention as defined by the appended claims. Furthermore, in the following detailed description of the invention, numerous specific details are set forth in order to provide a thorough understanding of various embodiments in accordance with the invention. However, it will be apparent to one skilled in the art that embodiments in accordance with the invention may be practiced without these specific details. In other instances, well-known methods, procedures, components, structures and devices have not been described in detail so as to avoid unnecessarily obscuring aspects of embodiments in accordance with the invention.

Various embodiments in accordance with the invention provide a phase-diverse coherent optical spectrum analyzer. By utilizing a 3×3 optical coupler, phase diversity is achieved, such that the accuracy and certainty of an amplitude reading is improved. Furthermore, the phase-diverse coherent optical spectrum analyzer provides for appropriate signal processing such that the positive and negative frequency images can be separated, improving spectral resolution. Following such signal processing, the phase-diverse coherent optical spectrum analyzer may include a measurement unit whose purpose is to calculate and display spectral amplitude, chirp, or other measurements as a function of wavelength. The use of phase diversity improves amplitude accuracy and resolution in the coherent optical spectrum analyzer, and may enable additional measurements such as chirp or frequency modulation.

Figure 1A:
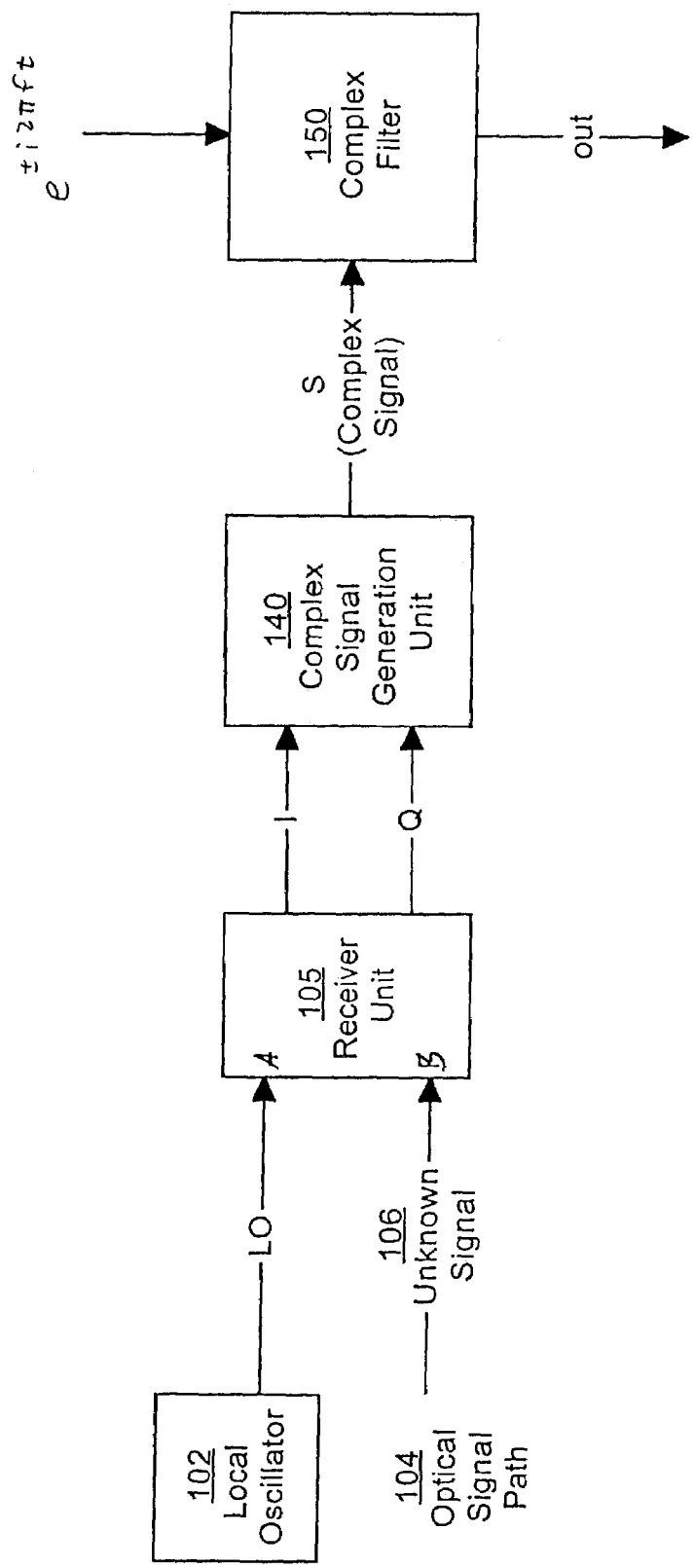
FIG. 1A is a diagram illustrating a phase-diverse coherent optical spectrum analyzer of an embodiment in accordance with the invention.

FIG. 1A is a diagram illustrating a phase-diverse coherent optical spectrum analyzer 100 of an embodiment in accordance with the invention. Phase-diverse coherent optical spectrum analyzer 100 comprises local oscillator 102 for producing a local oscillator signal (LO) and providing the LO to an input A of receiver unit 105. In one embodiment in accordance with the invention, local oscillator 102 is a laser source, such as a tunable external cavity laser diode. In one embodiment, the LO is continuously swept. Optical signal path 104 is coupled to input B of receiver unit 105 for providing an input signal to input B. In one embodiment in accordance with the invention, the input signal is unknown signal 106. In one embodiment in accordance with the invention, unknown signal 106 is output from an optical network. In one embodiment, the components of phase-diverse coherent optical spectrum analyzer 100 are fiber based.

Figure 1B:
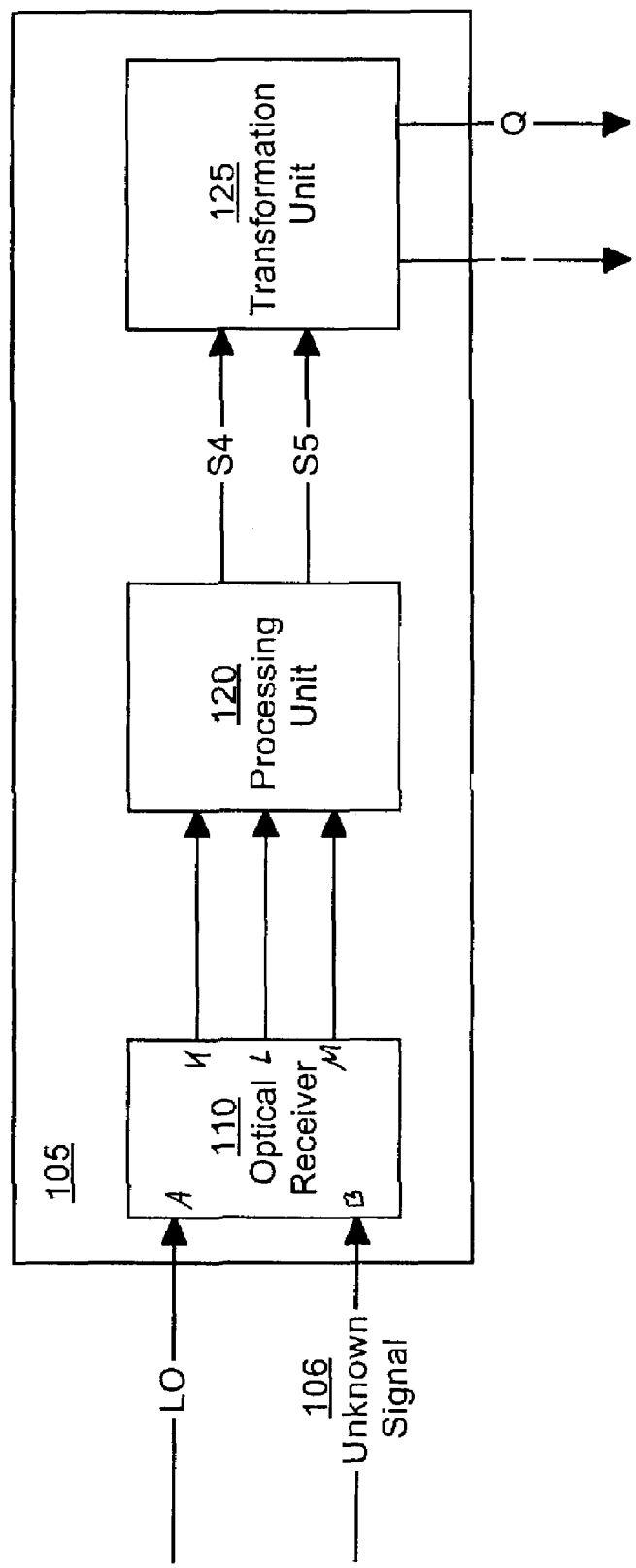
FIG. 1B is a diagram illustrating a receiver unit of an embodiment in accordance with the invention.

With reference to FIG. 1B, receiver unit 105 is illustrated of an embodiment in accordance with the invention. Receiver unit 105 comprises optical receiver 110, processing unit 120, and transformation unit 125. Optical receiver 110 comprises two inputs A and B and at least three outputs K, L and M. In one embodiment in accordance with the invention, optical receiver 110 comprises a 3×3 optical coupler (e.g., optical coupler 210 of FIG. 2) for producing three output signals. Output signals K, L, and M are produced based on LO and unknown signal 106. It should be appreciated that embodiments in accordance with the invention may be implemented using an optical coupler other than a 3×3 optical coupler. In one embodiment in accordance with the invention, a 4×4 optical coupler is used. In another embodiment in accordance with the invention, a series of 2×2 optical couplers is used to produce at least three output signals. For purposes of the application, embodiments in accordance with the invention are described comprising a 3×3 optical coupler. However, it should be appreciated that those skilled in the art would understand how to implement the invention using different optical couplers (e.g., a 4×4 optical coupler).

Figure 2:
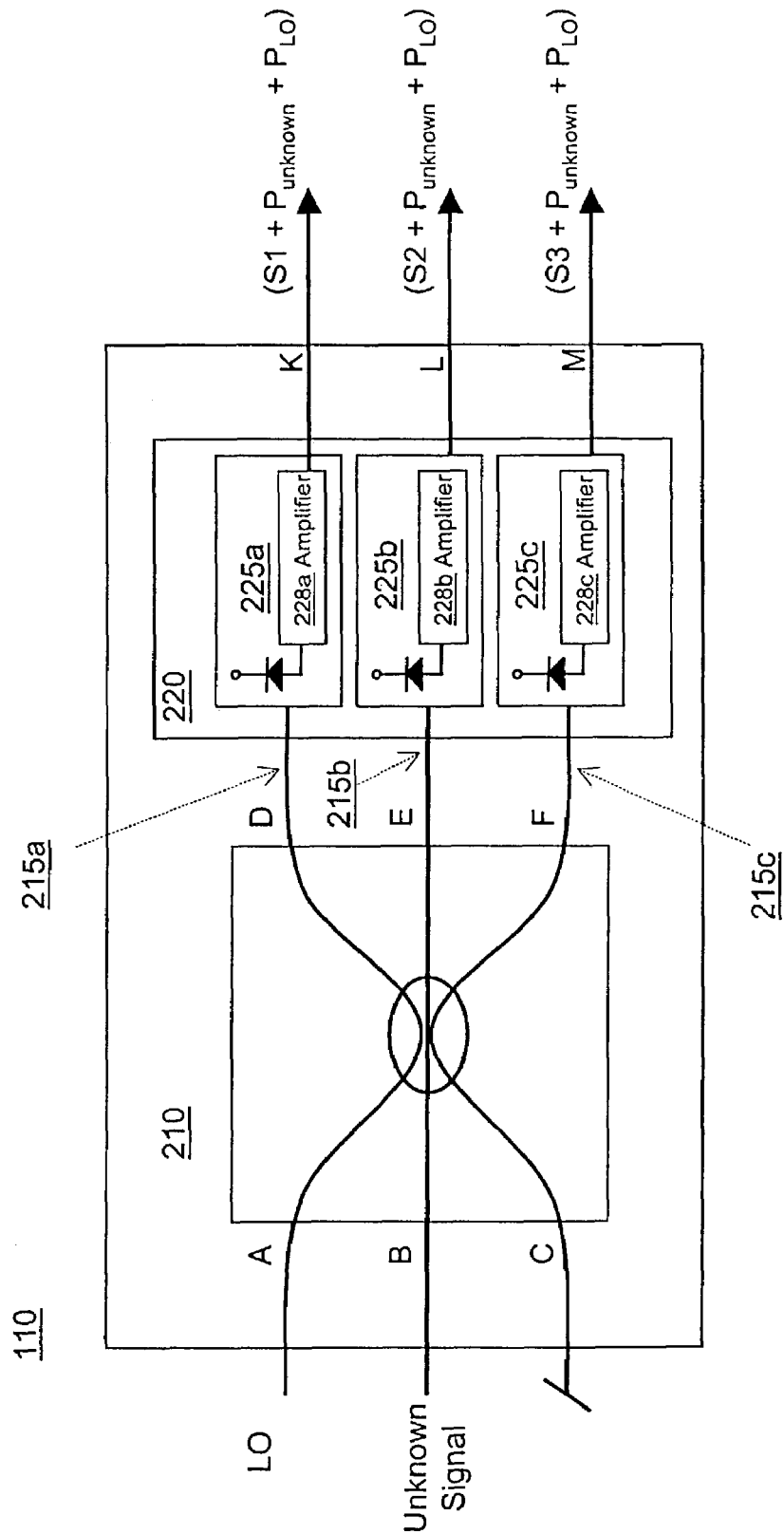
FIG. 2 is a diagram illustrating an optical receiver comprising a 3×3 optical coupler of an embodiment in accordance with the invention.

FIG. 2 is a diagram illustrating an optical receiver 110 of an embodiment in accordance with the invention. Optical receiver 110 comprises 3×3 optical coupler 210 and detecting unit 220. 3×3 optical coupler 210 comprises two optical inputs A and B and three optical outputs D, E and F. For illustrative purpose, input C is shown as unconnected and not receiving any signal. It should be appreciated that there are only two optical inputs, and that input C is not necessary. In one embodiment in accordance with the invention, 3×3 optical coupler 210 receives a local oscillator signal LO at input A and an optical input signal from the signal path 104 at input B. In one embodiment in accordance with the invention, the optical input signal is unknown signal 106. In one embodiment, 3×3 optical coupler 210 is a fiber-optic coupler.

In one embodiment in accordance with the invention, 3×3 optical coupler 210 is a balanced optical coupler that has a splitting ratio of one-third to each output. 3×3 optical coupler 210 combines the optical signals received at inputs A and B, and outputs summed optical signals via optical outputs D, E and F. More particularly, a portion of each of LO and unknown signal 106 presented to the inputs A and B, respectively, of optical receiver 110 will be distributed to each of the optical outputs D, E and F. The portion of the signal distributed will be dependent upon the splitting ratio of the 3×3 optical coupler 210. In one embodiment in accordance with the invention, optical coupler 210 provides an equal one-third of the combined unknown signal 106 and LO to optical outputs D, E and F. However, it should be appreciated that 3×3 optical coupler 210 may have a different split ratios such as, for example, but not limited to, a 25/25/50 split ratio.

Detector unit 220 comprises detector 225a and amplifier 228a that are coupled to optical output D of 3×3 optical coupler 210 via optical lead 215a, detector 225b and amplifier 228b that are coupled to optical output E of 3×3 optical coupler 210 via optical lead 215b, and detector 225c and amplifier 228c that are coupled to optical output F of 3×3 optical coupler 210 via optical lead 215c. Detector 225a produces a signal proportional to the sum of the power in the LO ($P_{LO}$), the power in the unknown signal 106 ($P_{unknown}$), and an electrical mixing (or heterodyne beat) signal S1 in response to an optical signal at output D. Detector 225b produces a similar signal with electrical mixing signal S2 in response to an optical signal at output E, and detector 225c produces a similar signal with electrical mixing signal S3 in response to an optical signal at output F. More particularly, detectors 225a–c respond to the intensity of an optical signal at outputs D, E and F, respectively. In one embodiment in accordance with the invention, detectors 225a–c are photodiodes, which exhibit a square-law detection response; however it should be appreciated that any nonlinear detection device may be used. Photodiodes allow the LO signal and unknown signal to mix producing a heterodyne beat (e.g., S1, S2 and S3).

With reference to FIG. 2, it should be appreciated that electrical mixing signals S1, S2 and S3 produced by the detectors 225a–c in response to the summed optical signals output by 3×3 optical coupler 210 have the same intensity characteristics, but differ in phase by 120 degrees. FIG. 4A is a graph 400 illustrating the relative phase angles of the heterodyne beat frequencies of an embodiment in accordance with the invention. As shown in graph 400, S1, S2 and S3, the heterodyne terms produced upon mixing at detectors 225a–c, differ in phase by 120 degrees.

With reference again to FIG. 1B, phase-diverse coherent optical spectrum analyzer 100 also comprises processing unit 120 for discarding the noise portions (e.g., $P_{unknown}$ and PLO) and outputting output signals S4 and S5. Processing unit 120 can also compensate for any imbalances or noise in the response/transfer characteristics of K, L and M. It should be appreciated that in certain situation, the noise portions are small enough so that processing unit 120 is not required to account for the noise portion, and outputs output signals S4 and S5 as any two of K, L and M. Transformation unit 125 transforms S4 and S5 into two quadrature signals that differ in phase by 90 degrees with respect to each other.

Figure 3:
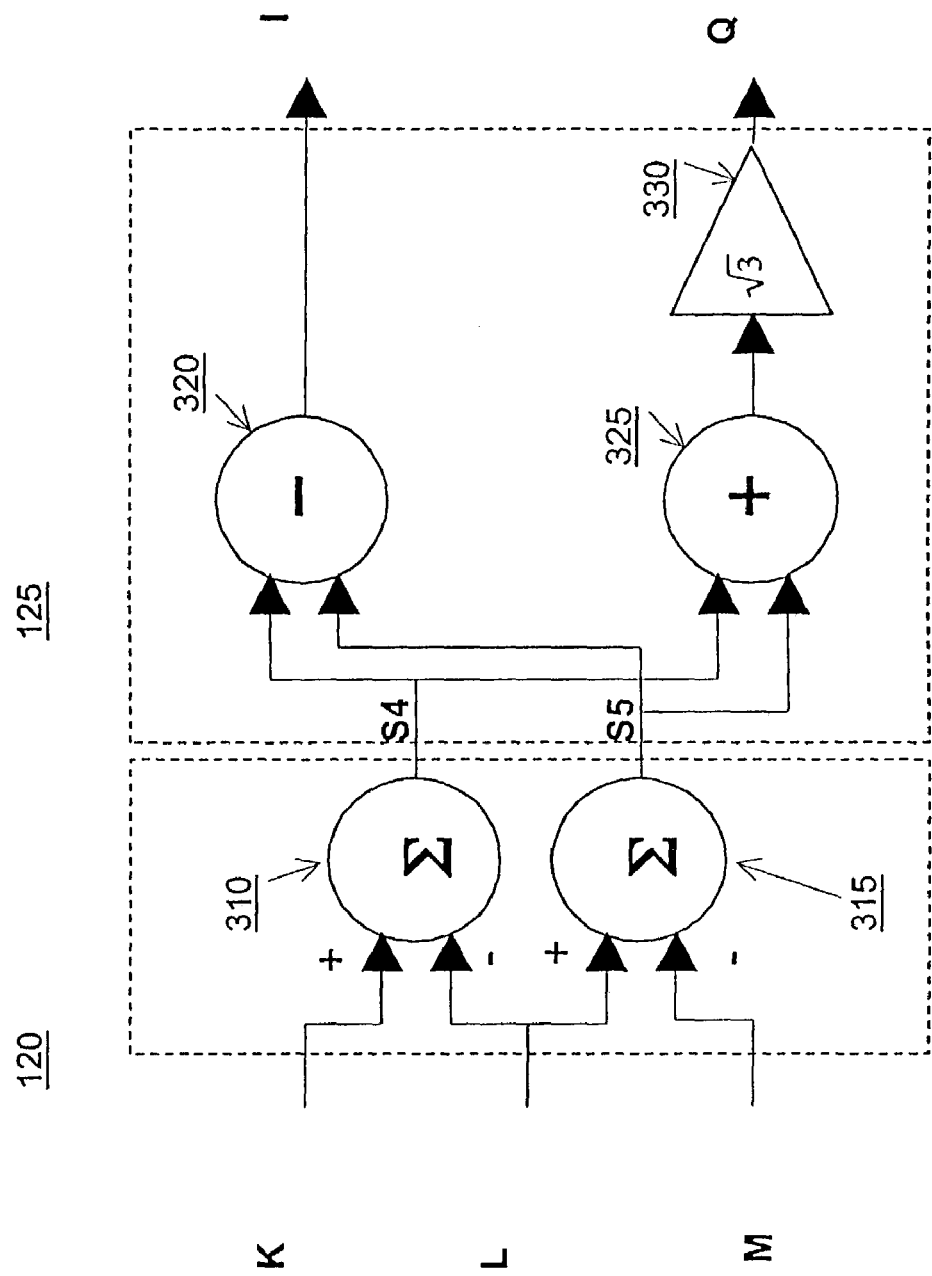
FIG. 3 is a diagram illustrating a processing unit and a transformation unit of an embodiment in accordance with the invention.

FIG. 3 is a diagram illustrating a processing unit 120 and a transformation unit 125 of an embodiment in accordance with the invention. Processing unit 120 comprises summing circuits 310 and 315. In another embodiment in accordance with the invention, noise subtraction is performed on K, L and M, where L is used as a common-mode channel. It should be appreciated that any of signals K, L and M can be used as a common-mode channel. The photocurrents detected at detectors 225a–c comprise power contributions from light intensity passing through optical receiver 110 as well as contributions from the mixing, or interference, of unknown signal 106 (unknown signal light) with LO (LO light).

It should be appreciated that in one embodiment, where the noise portions (e.g., $P_{unknown}$ and $P_{LO}$) are small, processing unit 120 is not required to perform noise subtraction. In the present embodiment, K=S1, L=S2, and M=S3. Only two of the three outputs are essential for continued signal processing.

At summing circuit 310, L is subtracted from K, isolating the mixing term S4=S1−S2, according to Equation 4:

$$K - L = S4 \propto \sqrt{P_{LO}P_{unknown}} \cos(2\pi\Delta ft + \phi) \tag{4}$$

wherein $P_{LO}$ represents the power in the LO, $P_{unknown}$ represents the power in the unknown signal 106, Δf represents the difference in frequencies between local oscillator frequency LO and unknown signal 106, t represents the time, and φ represents the relative phase between the LO and unknown frequencies.

Similarly, at summing circuit 315, M is subtracted from L, isolating the mixing term S5=S2−S3, according to Equation 5:

$$L - M = S5 \propto \sqrt{P_{LO}P_{unknown}} \cos(2\pi\Delta ft + \phi + 120°) \tag{5}$$

wherein $P_{LO}$ represents the power in the LO, $P_{unknown}$ represents the power in the unknown signal 106, Δf represents the difference in frequencies between local oscillator frequency LO and unknown signal 106, t represents the time, and φ represents the phase.

Signals S4 and S5 are electrical signals from which the amplitude and phase of the heterodyne signal can be determined. As can be seen at Equations 4 and 5, S4 and S5 differ by 120 degrees and are phase-diverse. In order to obtain accurate calculations for amplitude and phase, it is convenient to transform S4 and S5 into quadrature signals differing by 90 degrees (e.g., resolved on an orthogonal basis). In one embodiment, where noise subtraction is unnecessary due to the noise portions being small, S4=K and S5=L. It should be appreciated that S4 and S5 may be any combination of K, L and M.

In one embodiment in accordance with the invention, processing unit 120 is implemented as electronic circuitry coupled to optical receiver 110. In another embodiment in accordance with the invention, processing unit 120 is implemented as computer code resident within a computer readable medium for receiving inputs representing signals K, L and M and isolating the heterodyne signal by producing signals S4 and S5. It should be appreciated that processing unit 120 can be tailored to account for a non-ideal coupler and/or photodetectors. For example, if the loss of the 3×3 coupler is different in each path, processing unit 120 may include gain elements to balance the subtraction. Also, for example, if the photodetectors in detector unit 220 have different frequency responses, processing unit 120 may include filters to equalize the response of the channels before the subtraction is performed.

S4 and S5 are received at transformation unit 125 of FIG. 3. Transformation unit 125 operates on the assumption that signals S1, S2 and S3 are derived from an ideal 3×3 coupler which has a 120 degree phase relation between the various outputs. This is a consequence of energy conservation within the coupler. It should be appreciated that transformation unit 125 can be tailored to account for a non-ideal coupler. For example, if the phase relation of the 3×3 coupler is not exactly 120 degrees, the root 3 can be altered slightly to account for the difference.

Transformation unit 125 operates to transform signals S4 and S5, which differ by 120 degrees, into two quadrature signals I and Q differing in phase by 90 degrees. Specifically, transformation circuit 125 receives signals S4 and S5. Quadrature signal I is determined by subtracting S5 from S4 at subtractor 320, as shown at Equation 6:

$$I = S4 - S5 \qquad (6)$$

Substituting the terms for S4 and S5 from Equations 4 and 5, respectively, quadrature signal I is determined according to Equation 7:

$$I = S1 - 2S2 + S3 \qquad (7)$$

Quadrature signal Q is determined by adding S4 and S5 at adder 325, and multiplying this sum by $\sqrt{3}$ at multiplier 330, as shown at Equation 8:

$$Q = \sqrt{3}(S4 + S5) \qquad (8)$$

Substituting the terms for S4 and S5 from Equations 4 and 5, respectively, quadrature signal Q is determined according to Equation 9:

$$Q = \sqrt{3}(S1 - S3) \qquad (9)$$

In one embodiment in accordance with the invention, transformation unit 125 is implemented as electronic circuitry coupled to processing unit 120. In another embodiment in accordance with the invention, transformation unit is implemented as computer code resident within a computer readable medium for transforming inputs representing signals S4 and S5 into quadrature values.

It should be appreciated that transformation unit 125 may not be required in particular embodiments in accordance with the invention. For example, where a 4×4 optical coupler is used rather than a 3×3 optical coupler, the heterodyne terms vary from each other by multiples of 90 degrees. As such, the functionality of transformation unit 125 is performed at processing unit 120.

Figure 4B:
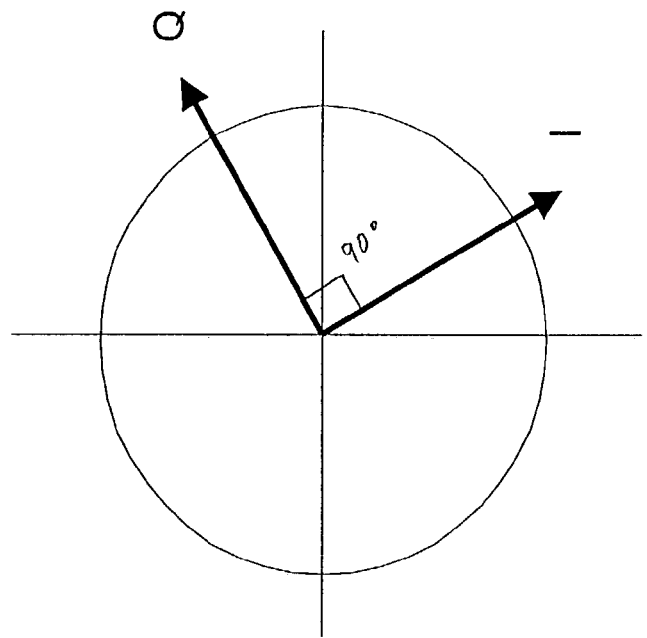
FIG. 4B is a graph illustrating the relative phase of the quadrature signals of an embodiment in accordance with the invention.
Figure 4A:
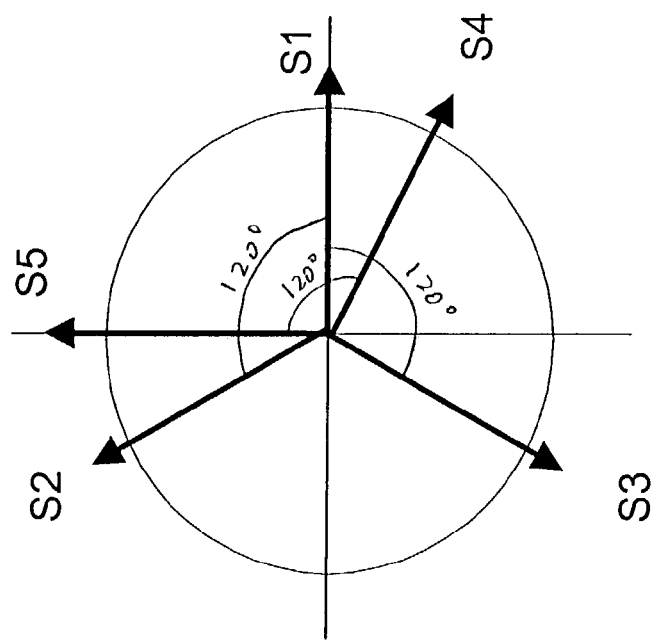
FIG. 4A is a graph illustrating the relative phase of heterodyne terms of an embodiment in accordance with the invention.

FIG. 4B is a graph 450 illustrating the relative phase of the quadrature signals I and Q of an embodiment in accordance with the invention. As shown in graph 450, I and Q, the quadrature signals produced from phase-diverse coherent optical spectrum analyzer 100, differ in phase by 90 degrees. Since I and Q are phase-diverse, the amplitude accuracy of phase-diverse coherent optical spectrum analyzer 100 is improved. Furthermore, appropriate signal processing allows for the separation of positive and negative frequency images, thereby improving spectral resolution.

With reference again to FIG. 1A, phase-diverse coherent optical spectrum analyzer 100 further comprises complex signal producion unit 140 for producing a complex signal comprising quadrature signals I and Q. Complex signal S can be defined as comprising quadrature signals I and Q, as shown at Equation 10:

$$S = I + iQ = (Amplitude)e^{i(2\pi ft + \phi)} \propto \sqrt{P_{LO}P_{unknown}} e^{i(2\pi ft + \phi)} \qquad (10)$$

Complex signal S, by construction, has a determined amplitude and phase $\phi$. This amplitude is proportional to the unknown signal power ($P_{unknown}$) and allows its accurate measurement independently of the value of the phase $\phi$. This is one of the benefits of using a phase-diverse receiver in the coherent optical spectrum analyzer. Furthermore, complex signal S can be filtered with complex filter 150 to isolate negative and/or positive frequencies as needed. In one embodiment in accordance with the invention, complex filter 150 is constructed according to some appropriately windowed complex impulse response based on $e^{\pm i2\pi ft}$, to isolate negative and/or positive frequencies, wherein f is the desired filter center frequency. In the case that I and Q have been bandpass filtered by receiver unit 105, the negative and positive images which result can be individually isolated with complex filter 150. This improves spectral resolution and may have other advantages such as allowing for chirp or frequency modulation (FM) measurements.

Spectral analysis typically relies on using narrow-band optical receivers for analyzing the spectral properties of a signal. In contrast, coherent communications requires wide-band operation for identifying channels that are needed in coherent communications. Therefore, phase-diverse receivers for use in coherent communications are concerned with the time domain response of a data channel, and are not directly concerned with the spectral domain of a signal. In particular, the wide-band operating requirements of phase-diverse receivers used in coherent communications are generally not applicable to narrow-band operation for use in spectral analysis. The performance requirements for a narrow-band receiver are different from the requirements for a wide-band communication system.

FIG. 5 is a flowchart illustrating a process for analyzing an optical signal of an embodiment in accordance with the invention. In one embodiment in accordance with the invention, process 500 is performed at a phase-diverse coherent optical spectrum analyzer (e.g., phase-diverse coherent optical spectrum analyzer 100 of FIG. 1A). Although specific blocks are disclosed in process 500, such blocks are exemplary. That is, the embodiments in accordance with the invention are well suited to performing various other blocks or variations of the blocks recited in FIG. 5.

At block 510 of process 500, a first optical input signal is received. In one embodiment in accordance with the invention, the first optical input signal is a local oscillator signal LO (e.g., local oscillator signal LO of FIG. 1A). In one embodiment in accordance with the invention, local oscillator signal LO is received from a laser source, such as a tunable external cavity laser diode.

At block 520, a second optical input signal is received. In one embodiment in accordance with the invention, the second optical input signal is an unknown signal (e.g., unknown signal 106 of FIG. 1A). In one embodiment in accordance with the invention, unknown signal 106 is an optical output signal from an optical network.

At block 530, at least a first output signal, a second output signal, and a third output signal are produced based on the first optical input signal and the second optical input signal. It should be appreciated that any number of output signals can be produced depending on the characteristics of the optical coupler. In one embodiment in accordance with the invention, the optical coupler is a 3×3 optical coupler. In another embodiment in accordance with the invention, the optical coupler is a 4×4 optical coupler wherein the output signals differ in phase by multiples of ninety degrees.

At block 540, the heterodyne signals are isolated from the first output signal, the second output signal and the third output signal. In one embodiment in accordance with the invention, the non-heterodyne signals are removed by subtracting the second output signal from the first output signal and subtracting the third output signal from the second output signal. It should be appreciated that the heterodyne signals are phase-diverse. In another embodiment where the output signals have little noise, two of the three outputs may be used to isolate the heterodyne signals. In one embodiment, to easily determine the amplitude and phase, the heterodyne signals may be resolved on an orthogonal basis.

At block 550, the heterodyne signals are transformed into an orthogonal basis by constructing a first quadrature signal and a second quadrature signal. The first quadrature signal and second quadrature signal differ in phase by 90 degrees, such that phase diversity of the original heterodyne beat is resolved into an orthogonal basis by the phase-diverse coherent optical spectrum analyzer. It should be appreciated that step 550 may not be necessary in various embodiments in accordance with the invention. For example, where the optical coupler is a 4×4 optical coupler, the heterodyne signals as determined at block 540 will vary in phase by 90 degrees, providing their orthogonal basis.

At block 560, the amplitude and phase of the heterodyne signal is determined based on the first quadrature signal and the second quadrature signal. It should be appreciated that block 560 is optional.

At block 570, the first quadrature signal and second quadrature signal are filtered with a complex filter to isolate negative and/or positive frequencies as needed (e.g., for bandpass architectures). In one embodiment in accordance with the invention, complex filter 150 filters according to $e^{\pm i 2\pi f t}$ to isolate negative and/or positive frequencies.

Various embodiments in accordance with the invention, a phase-diverse coherent optical spectrum analyzer is provided. By implementing a 3×3 optical coupler, phase diversity is achieved, thereby improving the accuracy and certainty of an amplitude reading. Furthermore, the positive and negative frequency images can be separated by appropriate signal processing, improving spectral resolution. Moreover, implementing a 3×3 optical coupler provides greater flexibility in optical receiver design.

Various embodiments in accordance with the invention, a phase-diverse coherent optical spectrum analyzer, are thus described. While the invention has been described in particular embodiments in accordance with the invention, it should be appreciated that the invention should not be construed as limited by such embodiments in accordance with the invention, but rather construed according to the below claims.

What is claimed is:

1. A phase-diverse coherent optical spectrum analyzer comprising:
    a narrow-band optical receiver for receiving a first input signal and a second input signal, and producing at least a first output signal, a second output signal, and a third output signal based on mixing said first input signal and said second input signal, wherein said mixing is done by said narrow-band optical receiver;
    a processing unit for isolating heterodyne components of said first output signal, said second output signal, and said third output signal, said heterodyne components comprising a first signal and a second signal such that phase diversity of the heterodyne components between said first input signal and said second input signal is achieved by said phase-diverse coherent optical spectrum analyzer.

2. The phase-diverse coherent optical spectrum analyzer as recited in claim 1 wherein said narrow-band optical receiver comprises a 3×3 optical coupler.

3. The phase-diverse coherent optical spectrum analyzer as recited in claim 2 wherein said first input signal is a first optical input signal, said second input signal is a second optical input signal, said first output signal is a first optical output signal, said second output signal is a second optical output signal, and said third output signal is a third optical output signal.

4. The phase-diverse coherent optical spectrum analyzer as recited in claim 3 wherein said narrow-band optical receiver further comprises a square law detector unit for converting said first optical output signal to a first electrical output signal, said second optical output signal to a second electrical output signal, and said third optical output to a third electrical output signal.

5. The phase-diverse coherent optical spectrum analyzer as recited in claim 4 wherein said square law detector unit comprises a first photodiode for converting said first output signal into said first optical electrical output signal, a second photodiode for converting said second optical output signal into said second electrical output signal, and a third photodiode for converting said third optical output into said third electrical output signal.

6. The coherent optical spectrum analyzer as recited in claim 1 further comprising a transformation unit for transforming said heterodyne components into a first quadrature signal and a second quadrature signal such that orthogonality of the phase diverse heterodyne components between said first input signal and said second input signal is achieved by said phase-diverse coherent optical spectrum analyzer.

7. The phase-diverse coherent optical spectrum analyzer as recited in claim 6 further comprising a complex filter for filtering said first quadrature signal and said second quadrature signal to isolate a frequency.

8. The phase-diverse coherent optical spectrum analyzer as recited in claim 6 further comprising a measurement unit for calculating amplitude and phase of a heterodyne signal comprising said heterodyne components based on said first quadrature signal and said second quadrature signal.

9. The phase-diverse coherent optical spectrum analyzer as recited in claim 6 wherein said processing unit is operable to subtract said second output signal from said first output signal to produce a fourth output signal and said third output signal from said second output signal to produce a fifth output signal and to isolate said heterodyne terms.

10. The phase-diverse coherent optical spectrum analyzer as recited in claim 9 wherein said transformation unit is operable to transform said fourth output signal and said fifth output signal into said first quadrature signal and said second quadrature signal.

11. The phase-diverse coherent optical spectrum analyzer as recited in claim 1 wherein said second input signal is an optical local oscillator signal.

12. The phase-diverse coherent optical spectrum analyzer as recited in claim 11 wherein said optical local oscillator signal is sweeping in frequency.

13. The phase-diverse coherent optical spectrum analyzer as recited in claim 1 further comprising a complex filter for filtering said first signal and said second signal to isolate a frequency.

14. A phase-diverse coherent optical spectrum analyzer comprising:
    a narrow-band optical receiver comprising:
        a first input for receiving a first optical input signal;
        a second input for receiving a second optical input signal; and
        an optical coupler for receiving said first optical input signal and said second optical input signal, and producing at least three optical output signals based on said first optical input signal and said second optical input signal, wherein said optical coupler combines
said first optical input signal and said second optical input signal;
a detector unit for converting said optical output signals into corresponding electrical output signals allowing for mixing of said first optical input signal and said second optical input signal; and
a processing unit for isolating heterodyne signals from said electrical output signals, said heterodyne signals comprising a first signal and a second signal such that phase diversity of the heterodyne components between said first input signal and said second input signal is achieved by said phase-diverse coherent optical spectrum analyzer.

15. The phase-diverse coherent optical spectrum analyzer as recited in claim 14 further comprising a transformation unit for transforming said electrical output signals into a first quadrature signal and a second quadrature signal such that phase diversity of the heterodyning of said first optical input signal and said second optical input signal is resolved into an orthogonal basis by said phase-diverse coherent optical spectrum analyzer.

16. The phase-diverse coherent optical spectrum analyzer as recited in claim 15 further comprising a complex filter for filtering said first quadrature signal and said second quadrature signal to isolate a frequency.

17. The phase-diverse coherent optical spectrum analyzer as recited in claim 14 wherein said optical coupler is a 3×3 optical coupler.

18. The phase-diverse coherent optical spectrum analyzer as recited in claim 14 further comprising a local oscillator for producing a local oscillator signal, wherein said local oscillator signal is said second input signal.

19. The phase-diverse coherent optical spectrum analyzer as recited in claim 18 wherein said local oscillator signal is sweeping in frequency.

20. The phase-diverse coherent optical spectrum analyzer as recited in claim 18 wherein said processing unit is operable to subtract out a noise portion of said heterodyne signals.

21. The phase-diverse coherent optical spectrum analyzer as recited in claim 14 wherein said detector unit comprises at least three photodiodes corresponding to said optical output signals, said photodiodes for converting said optical output signals into said corresponding electrical output signals.

22. The phase-diverse coherent optical spectrum analyzer as recited in claim 14 further comprising a complex filter for filtering said first signal and said second signal to isolate a frequency.

23. A method for analyzing an optical signal comprising:
receiving a first optical input signal at a narrow-band optical receiver of a phase-diverse coherent optical spectrum analyzer;
receiving a second optical input signal at said narrow-band optical receiver;
producing a first output signal, a second output signal, and a third output signal based on mixing said first optical input signal and said second optical input signal;
isolating heterodyne components of said first output signal, said second output signal and said third output signal, said heterodyne components comprising a first quadrature signal and a second quadrature signal such that phase diversity of the heterodyne mixing between said first input signal and said second input signal is achieved by said phase-diverse coherent optical spectrum analyzer.

24. The method as recited in claim 23 further comprising calculating amplitude and phase of said mixing of first optical input signal and second optical input signal based on said first quadrature signal and said second quadrature signal.

25. The method as recited in claim 23 further comprising filtering said first quadrature signal and said second quadrature signal to isolate a frequency.

* * * * *